Sept. 12, 1967  L. F. MOATE  3,341,145
METHOD OF, AND APPARATUS FOR, FACILITATING THE
ADJUSTMENT OF A ROLLSTAND SPIDER
Filed Sept. 1, 1965
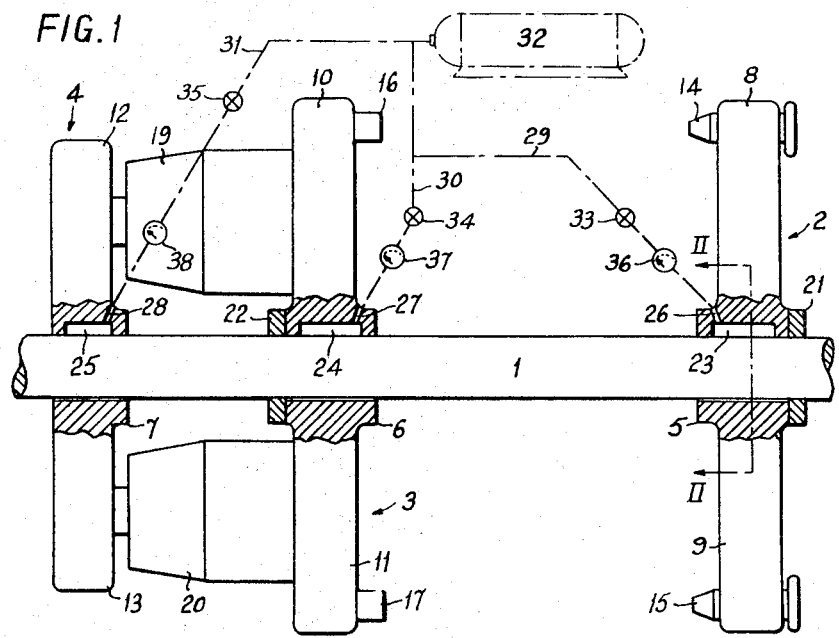
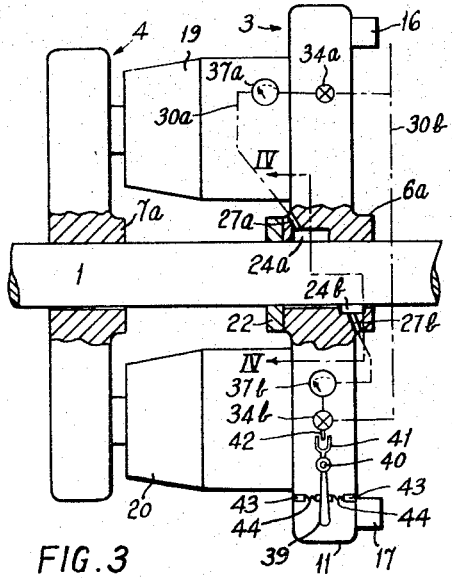
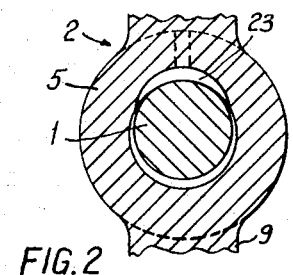
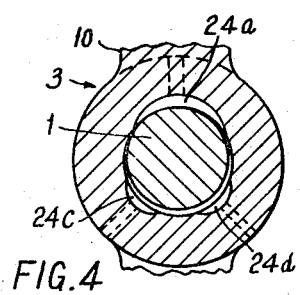
Inventor
Leslie Frank Moate
By
Michael J. Striker
Attorney 3,341,145
METHOD OF, AND APPARATUS FOR, FACILITATING THE ADJUSTMENT OF A ROLLSTAND SPIDER
Leslie Frank Moate, Ingrave, Brentwood, Essex, England, assignor to Fuller Electric Limited, London, England, a British company
Filed Sept. 1, 1965, Ser. No. 484,350
Claims priority, application Great Britain, Sept. 10, 1964, 37,009/64
12 Claims. (Cl. 242—64)

ABSTRACT OF THE DISCLOSURE

A rollstand comprising a substantially horizontally extending rollstand shaft and at least rollstand spider having a hub provided with a bore through which the shaft extends with clearance. The hub is provided with a recess communicating with the bore. Supply means for supplying pressurized gas communicate with the recess and is adapted to supply pressurized gas thereto at a pressure sufficient to lift the spider so as to cause it to float on the shaft.

---

This invention relates to a method of, and apparatus for, facilitating the adjustment of a spider of a rollstand in the longitudinal direction of the rollstand shaft.

A rollstand is an apparatus for rotatably supporting a reel core on to which, or from which, a web of material, for example paper, is wound or unwound. A conventional rollstand comprises a substantially horizontally disposed shaft upon which two spiders are mounted in spaced relationship. These spiders each have a central hub which is rotatably mounted on the shaft and two or three arms projecting radially from the hub, depending on whether the rollstand is of the two- or three-arm type. A reel core is mounted in the rollstand with one end thereof rotatably supported by an arm of one spider and the other end thereof rotatably supported by an arm of the other spider. The two spiders are maintained at the correct distance apart, to suit the length of the reel core, by means of collars which can be locked to the shaft.

In order that such rollstands shall be able to accommodate reel cores of different lengths, it is essential that at least one of the spiders should be adjustable in the longitudinal direction of the rollstand shaft.

Several devices for adjusting the spiders of rollstands are known. For example, it is known to cut gear teeth in the surface of the rollstand shaft so as to form a toothed rack extending in the direction of the shaft axis. A toothed pinion is then rotatably mounted in the hub of the spider, with its teeth in engagement with the rack teeth, so that rotation of the pinion causes displacement of the spider along the rollstand shaft. This device, and other devices at present used for the same purpose, are expensive to manufacture and frequently require considerable physical effort on the part of the rollstand operator in order to actuate them.

An object of the present invention is to provide a method of, and an apparatus for, facilitating the adjustment of a spider of a rollstand which do not have the drawbacks of the previously known methods and apparatus.

According to the invention a method of facilitating the adjustment of a spider of a rollstand in the longitudinal direction of the rollstand shaft, which spider comprises a hub rotatably mounted on the rollstand shaft comprises the step of delivering gas under super-atmospheric pressure to a space defined between the rollstand shaft and the internal wall of said hub and situated above the axis of the rollstand shaft. In this way there is produced a cushion of pressurised gas in said space and if the pressure of the gas is suitably adjusted the spider can be made to rise slightly relative to the shaft so that it virtually floats on the shaft. When the spider is in this condition it requires only a small physical effort to move it along the shaft. In fact the spider may be moved along the rollstand shaft simply by pushing it or pulling it by hand, and there is no need to provide any mechanical device for the purpose.

In a conventional rollstand, one of the spiders (hereinafter referred to as the driving spider) has an electric motor mounted adjacent to the free end of each arm for the purpose of driving a reel core supported by the driving spider. These motors have their axes parallel to the rollstand shaft and it is customary to support the end of each motor lying remote from the driving spider in an auxiliary spider spaced from the driving spider and rotatably mounted on the rollstand shaft. This auxiliary spider also carries the sliprings for making the electrical connections to the motors. With such a rollstand it is necessary to move the driving and auxiliary spiders as a unit, when adjusting the driving spider in the longitudinal direction of the rollstand shaft. The method according to the invention may be applied to such a combination of a driving spider and an auxiliary spider in one of two ways. The first way involves supplying compressed gas to a space between the hub of each spider and the rollstand shaft. If the weights of the spiders are $W_D$ for the driving spider and $W_A$ for the auxiliary spider and if these two spiders have hubs of lengths $L_D$ and $L_A$, respectively, then in order to reduce to a minimum the force necessary to move the combination along the rollstand shaft the following conditions should exist:

$$W_D = L_D . d . P_d \qquad (1)$$

$$W_A = L_A . d . P_a \qquad (2)$$

where $d$ is the diameter of the rollstand shaft and $P_d$ and $P_a$ are the pressures of the gas in the spaces at the hubs of the driving and auxiliary spiders, respectively. If the two hubs have bores of exactly the same diameter, then $P_d$ will be approximately equal to $P_a$ if the two hubs are connected to the same compressed gas course. Under these conditions, division of Equation 1 by Equation 2 gives the result:

$$\frac{W_D}{W_A} = \frac{L_D}{L_A}$$

This means that the lengths of the hubs of the driving and auxiliary spiders should be chosen in proportion to the weights of these spiders.

A second way of applying the method according to the invention to the combination of a driving spider and an auxiliary spider involves supplying compressed gas to a plurality of spaces defined between the rollstand shaft and the internal wall of the hub of the driving spider only. By a suitable positioning of these spaces it is possible to raise both of the spiders relative to the rollstand shaft in such a way that the combined spiders can be moved easily along the rollstand shaft.

According to a further feature of the invention apparatus for facilitating the adjustment of a spider of a rollstand in the longitudinal direction of the rollstand shaft, comprises means for supplying gas at superatmospheric pressure to a space defined between the rollstand shaft and the bore of the spider hub. Preferably, means is provided for adjusting the pressure of the gas supplied to said space.

The invention will now be described in greater detail, by way of example, with reference to the accompanying drawing, in which FIGURE 1 is a schematic, partly sectioned side elevation of a rollstand illustrating the employment of the method according to the invention, FIGURE 2 is a section, on an enlarged scale, taken on the line II—II of FIGURE 1, FIGURE 3 is a view similar to FIGURE 1 of part of a first modified form of rollstand, and FIGURE 4 is a section, on an enlarged scale, of a modified form of part of the rollstand of FIGURE 3, this section being taken on a line such as the line IV—IV of FIGURE 3.

The rollstand shown in FIGURES 1 and 2 comprises a shaft 1 which is mounted in suitable supports (not shown) with its longitudinal axis substantially horizontal. Mounted on the shaft 1 are two main spiders and an auxiliary spider, generally designated by the reference numerals 2, 3 and 4, respectively. The spiders 2, 3 and 4 comprise hubs 5, 6 and 7, respectively, which are rotatable on the shaft 1 and these hubs have two arms 8 and 9, 10 and 11 and 12 and 13, respectively, projecting radially therefrom. At their free ends the arms 8 and 9 are provided with reel core supporting pivots 14 and 15, respectively, whilst reel core driving supports 16 and 17 are provided at the free ends of the arms 10 and 11, respectively. An electric motor 19 secured at one of its ends to the arm 10 serves to rotate the driving support 16 through suitable gearing (not shown) for the purpose of rotating a reel core (not shown) mounted at its ends on the pivot 14 and the support 16. A second electric motor 20 secured at one of its ends to the arm 11 serves to rotate the driving support 17 for the purpose of driving a reel core (not shown) mounted at its ends on the pivot 15 and the support 17. Locking rings 21 and 22 associated with the hubs 5 and 6, respectively, serve to lock the spiders 2 and 3, respectively, to the shaft 1 at the correct spacing apart to suit the length of the reel cores mounted between the spiders.

The end of the motor 19 remote from the arm 10 is supported by the arm 12 of the spider 4 and the end of motor 20 remote from the arm 11 is supported by the arm 13. The main or driving spider 3 and the auxiliary spider 4 are rotatable on and adjustable along the shaft 1 as a unit.

The rollstand so far described is of a type well-known in the art and no detailed description of the construction thereof is necessary.

In order that the rollstand shall be able to accommodate reel cores of different lengths between the spiders 2 and 3, the spider 2 and the unit consisting of the spiders 3 and 4 are adjustable in the longitudinal direction of the shaft 1. To facilitate the adjustment of the spiders along the shaft 1, each of the subs 5, 6 and 7 comprises a cavity 23, 24, 25, respectively, formed in its internal wall. Each cavity extends from a point near to one end of its hub to a point near to the other end of the hub. In the circumferential direction, each cavity extends around approximately one third of the internal wall of the hub (see FIGURE 2). Channels 26, 27 and 28 lead from the cavities 23, 24, and 25, respectively, to the external surfaces of the respective hubs 5, 6 and 7. The channels 26, 27 and 28 are connected by flexible pipes 29, 30 and 31, respectively, to a compressed air reservoir 32. Combined pressure-regulating and cut-off valves 33, 34 and 35, and pressure gauges 36, 37 and 38 are provided in the pipes 29, 30 and 31, respectively.

When it is desired to adjust the spiders 2, 3 and 4 along the shaft 1, the rings 21 and 22 are unlocked and the spiders are first rotated on the shaft until the cavities 23, 24 and 25 are situated directly above the axis of the shaft (as shown in FIGURES 1 and 2). The valves 33, 34 and 35 are then opened so that compressed air flows from the reservoir 32 into the cavities. By suitably adjusting the settings of the valves the pressure of the air in the cavities can be adjusted so that each of the spiders 2, 3 and 4 rises slightly relative to the shaft 1 and virtually floats on a cushion of compressed air. When the spiders are in this condition it requires only a very small physical effort to move them along the shaft. When the positions of the spiders have been suitably adjusted in this way, the valves 33, 34 and 35 are closed and the spiders 2 and 3 are locked in their new positions by means of the locking rings 21 and 22.

In one practical embodiment of a rollstand in accordance with FIGURES 1 and 2 the shaft 1 was made from unground steel and had a diameter of 6 inches. The spider 2 was made of cast iron and its hub 5 was 5.75 inches long and had a bore of 6.003 inches diameter. The cavity 23 had a length of approximately 5 inches, a maximum radial depth of approximately 0.25 inch and extended approximately 6 inches in the circumferential direction of the hub. This spider weighed 988 lbs. and when it was at rest on the shaft 1 it required a thrust of 216 lbs. to move the spider along the shaft with the valve 33 closed. This represents a coefficient of friction between the shaft and the spider hub of 0.219. When compressed air was supplied to the cavity 23 via the pipe 29, it was found that, as the pressure of the air in the cavity increased, the thrust necessary to move the spider along the shaft decreased until, when the pressure read on the gauge 36 was 40 p.s.i., the force required to move the spider reached a minimum value of 5.75 lbs., representing a coefficient of friction between the shaft and the spider hub of 0.00582. With the air pressure at this value the spider was floating on the shaft with a clearance of from 0.0005 to 0.015 inch between the shaft and the internal wall of the hub. When the air pressure was increased above 40 p.s.i. gauge the force necessary to move the hub along the shaft began to increase, due to the lower part of the internal wall of the hub being lifted up into contact with the undersurface of the rollstand shaft.

FIGURE 3 shows a part of a rollstand which, except for the fact that the hubs 6a and 7a of the spiders 3 and 4, respectively, have different constructions, is the same as the rollstand of FIGURES 1 and 2. In the embodiment of FIGURE 3 the hub 7a of the spider 4 does not have a cavity to which compressed air can be supplied. The hub 6a of the spider 3 has two cavities 24a and 24b formed in its internal wall, the two cavities being spaced apart by 180° around the hub wall. The cavity 24a is situated close to the end of hub 6a which is nearer to the spider 4 and the cavity 24b is situated close to the other end of the hub 6a. The cavities 24a and 24b are connected via channels 27a and 27b and pipes 30a and 30b to a compressed air reservoir as in the case of the rollstand of FIGURE 1.

When it is desired to adjust the unit consisting of the spiders 3 and 4 along the shaft 1, the ring 22 is unlocked and the spiders are rotated on the shaft 1 until the cavity 24a is directly above the shaft axis and consequently the cavity 24b is directly below this axis. The valve 34a is then opened to supply compressed air to the cavity 24a. This has the effect of raising the spider 3 relative to the shaft 1, the unit consisting of the two spiders performing a slight tilting movement in an anticlockwise direction (as viewed in FIGURE 3) about the hub 7a of the spider 4, due to the turning moment imposed on the spider 3 by the spider 4 and the motors 19 and 20. The valve 34b is then opened to supply compressed air to the cavity 24b. This has the effect of applying a turning moment to the spider 3 which is in opposition to the turning moment imposed by the spider 4 and the motors 19 and 20. Consequently the unit tilts in a clockwise direction (as viewed in FIGURE 3) about the hub 6a so that the spider 4 is caused to rise slightly relative to the shaft 1. By suitably adjusting the air pressures in the two cavities the two turning moments mentioned above can be made to counterbalance one another so that the unit consisting of the two spiders can be brought to the condition in which it virtually floats on the shaft.

FIGURE 3 also shows the possibility of mounting the compressed air control valves on the spiders. In this figure the valve 34b and the pressure gauge 37b are shown mounted on the spider arm 11. A lever 39 pivoted at 40 on the arm 11 has a bifurcated end 41 which receives the actuating member 42 of the valve 34b. Stops 43 limit the arc of travel of the lever 39 on its pivot 40, and springs 44 urge the lever into a central position between the stops 43, as shown in FIGURE 3. In this central position of the lever 39 the valve 34b is closed. If the lever 39 is moved from its central position into engagement with either one of the stops 43, the bifurcated end 41 of the lever moves the actuating member 42 to a position in which the valve 34b is opened. When the air pressure in the cavity 24b has reached the desired value the lever 39, abutting one of the stops 43, may be used as a handle for pushing or pulling the spider along the shaft 1.

FIGURE 4 shows a modified form of the rollstand of FIGURE 3 in which the cavity 24b of FIGURE 3 is replaced by two cavities 24c and 24d one disposed on each side of a diametral plane passing through the centre of the cavity 24a. The channels leading to these two cavities may be fed by a common compressed air line, or if desired each cavity may be fed by its own compressed air pipe, each of these pipes being provided with a pressure regulating valve.

I claim:
1. A method of facilitating the adjustment of an arrangement of the kind comprising a substantially horizontally disposed rollstand shaft and a rollstand spider rotatably mounted on said shaft and comprising a hub provided with a bore having an inner surface surrounding said shaft with slight clearance, said method comprising the step of delivering into a cavity formed in the hub and opening into the bore in a region situated above the axis of the shaft, a gaseous fluid under a pressure sufficient to cause the spider to float on the shaft, whereby adjustment of the spider in the longitudinal direction of the rollstand shaft is facilitated.

2. A method of facilitating the adjustment of a rollstand arrangement of the kind comprising a substantially horizontally disposed rollstand shaft, a driving spider and an auxiliary spider each rotatably mounted on said shaft and comprising a hub provided with a bore having an inner surface surrounding said shaft with slight clearance, and means joining the two spiders in spaced relationship along the shaft, said method comprising the step of supplying to cavities formed in the two hubs and each opening into the respective bore in a region situated above the axis of the shaft, a gaseous fluid under a pressure sufficient to cause the spiders to float on the shaft, whereby adjustment of the spiders as a unit in the longitudinal tion of the rollstand shaft is facilitated.

3. A method of facilitating the adjustment of a rollstand spider in a rollstand of the kind comprising a substantially horizontally disposed rollstand shaft, a driving spider and an auxiliary spider each comprising a hub provided with a bore through which said shaft passes with a clearance so that the spiders are rotatably mounted on said shaft and can be lifted slightly so as to float on the shaft, and means joining the two spiders in spaced relationship along the shaft, said method comprising the step of supplying gas under superatmospheric pressure to a plurality of cavities formed in one of the hubs, one of such cavities opening into the bore of said one hub in a region situated above the axis of the shaft and at least one other of such cavities opening into the bore of said one hub in a region situated below said axis, whereby adjustment of the spiders as a unit in the longitudinal direction of the rollstand shaft is facilitated.

4. The method claimed in claim 1, in which the pressure of the gas delivered to said cavity is variable.

5. The method claimed in claim 2, in which the pressure of the gas supplied to said cavities is variable.

6. The method claimed in claim 3, in which the pressure of the gas supplied to said cavities is variable.

7. In a rollstand comprising a rotatable spider having a hub provided with a bore and a substantially horizontally disposed rollstand shaft received with clearance in said bore whereby the spider can be lifted slightly to float on the shaft, the improvement comprising a recess provided in said hub and communicating with said bore; and means for supplying into said recess a gaseous fluid at a pressure requisite for lifting said spider on said shaft so as to cause the spider to float on the shaft.

8. In a rollstand comprising a rotatable driving spider and a rotatable auxiliary spider each having a hub provided with a bore, and a substantially horizontally disposed shaft received with clearance in the respective bores whereby the spiders can be lifted slightly to float on the shaft, and means joining the two spiders in spaced relationship along the shaft, the improvement comprising recess means provided in the respective hubs and communicating with the respective bores; and means for introducing gaseous fluid into said recess means at a pressure requisite for lifting said spiders on said shaft so as to cause them to float thereon.

9. In a rollstand comprising a rotatable driving spider and a rotatable auxiliary spider each having a hub provided with a bore, and a substantially horizontally disposed shaft received with clearance in the respective bores whereby the spiders can be lifted slightly to float on the shaft, and means joining the two spiders in spaced relationship along the shaft, the improvement comprising recess means provided in the hub of one of said spiders and communicating with said bore thereof, said recess means including a pair of recesses located on opposite sides of an axial plane passing through said shaft; and means for introducing gaseous fluid into said recess means at a pressure requisite for lifting said spiders so as to cause both of said spiders to float on said shaft.

10. A rollstand as defined in claim 7, said means comprising valve means operative for regulating the pressure of gaseous fluid supplied to said recess.

11. A rollstand as defined in claim 10, wherein said valve means is mounted on said spider.

12. A rollstand as defined in claim 11, wherein said means further comprises a lever pivotally mounted on said spider and operatively connected with said valve means for actuating the same, said lever also serving as a handle adapted to be grasped by an operator for adjusting the position of said spider along said rollstand shaft.

References Cited
UNITED STATES PATENTS

| | | | |
|---|---|---|---|
| 2,095,019 | 10/1937 | Wood | 242—64 |
| 2,195,141 | 3/1940 | Wood et al. | 242—64 |
| 2,263,303 | 11/1941 | Kaddeland | 242—64 |

FRANK J. COHEN, *Primary Examiner.*

WILLIAM S. BURDEN, *Examiner.*